United States Patent Office.

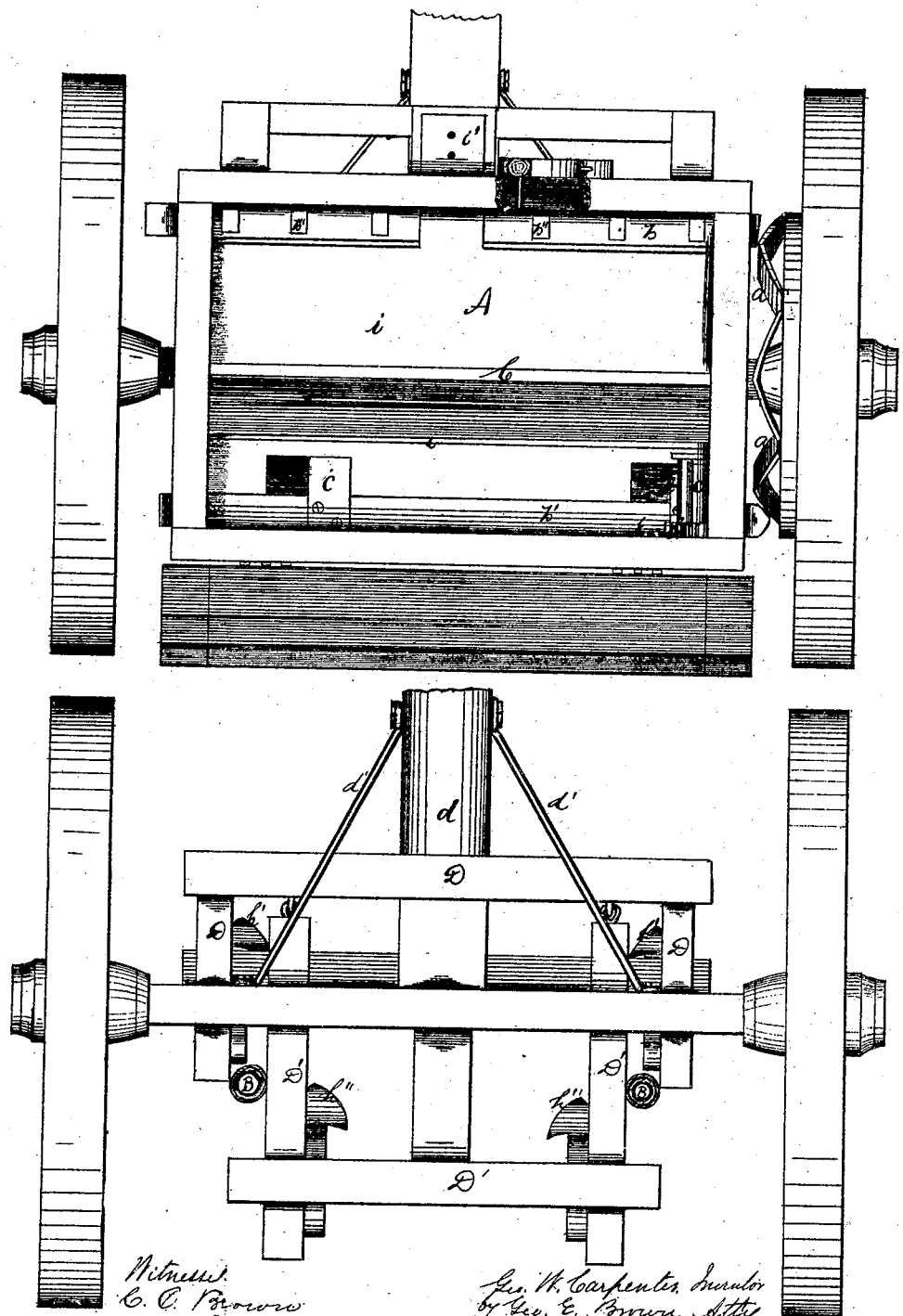

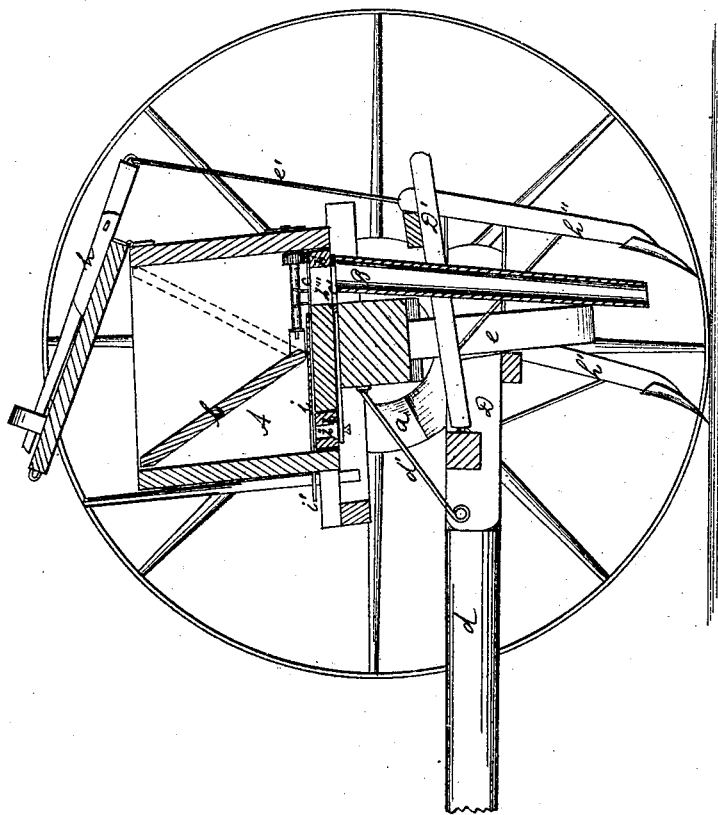

GEORGE W. CARPENDER, OF BUTLER, INDIANA.

Letters Patent No. 96,774, dated November 16, 1869.

IMPROVEMENT IN COMBINED SEED-PLANTER AND CULTIVATOR.

The Schedule referred to in these Letters-Patent and making part of the same.

*To all whom it may concern:*

Be it known that I, GEORGE W. CARPENDER, of Butler, in the State of Indiana, have invented a new and useful Improvement in the Combination of a Seeder, Planter, and Cultivator; and I do hereby declare that the following is a full, clear, and exact description of the same, reference being had to the accompanying drawings, and letters of reference marked thereon, making a part of this specification, in which—

Figure 1 is a plan view of the open seed-box.

Figure 2 is a plan view of the cultivator-frame, the seed-box being removed.

Figure 3 is a longitudinal vertical section.

To enable those skilled in the art to make and use my invention, I now proceed to describe its construction and operation.

Similar letters in the drawings refer to like parts.

This invention consists in providing the box in which the seed is deposited with two longitudinal slides at its bottom, one at each side, one slide being adapted for broadcast sowing, and the other slide for planting, there being a plate in the bottom of the box, capable of being moved transversely of it, so as to close either of the slides, as desired, and also a flap, extending lengthwise of the box, and pivoted at its bottom, so as to enlarge the space made for the reception of the seed, and separate the seed from the slide not in use.

The invention also consists in adapting, to the seeder and planter, a cultivator so constructed as to either cover seed when sown broadcast, or to open drills for the reception and covering of seed planted.

In the drawings—

A is a seed-box, mounted upon a frame, sustained upon an axle, supported upon wheels.

One of the wheels is provided with the usual annular serrated plate $a$ upon its inner side, concentric with the hub, and made in sections, removable, at pleasure.

Said rim operates, alternately, a pair of sliding bars, $b\ b'$, placed longitudinally of the bottom of the box A, and one at each side thereof.

The slide $b$ is pierced with numerous holes, $b''$, so as to fit it for a broadcast-sower, while the slide $b'$ has no orifices in it at all, but has two orifices, $b'''\ b'''$, next to it, in the bottom of the box, one near each end; and the said slide has plates $c\ c$ projecting from its upper surface, large enough to cover the orifices $b'''$.

On the under side of the slide $b'$ are two additional slides or plates, $c'\ c'$, of the same size as the plates $c$, and projecting the same way, but so placed as to close the lower mouths of the orifices $b'''$, when the plates $c$ open their upper mouths, and *vice versa*.

The seed-tubes B B open directly from the orifices $b'''$.

The slides $b\ b'$ are connected by a lever on the under side of the box A, and having its fulcrum between them.

On the edge of the slide $b'$, opposite the plates $c\ c'$, is a toothed segment, $k''$, which meshes with a toothed wheel, $L''$, on a shaft armed with hooks, $M''$, so placed and to be used to force the seed into the orifices $b'''$, when the upper slide is drawn from over it, said hooks to be used when planting cotton or broom-corn seed, and to be removed while planting corn.

On the bottom of the seed-box is placed a flat piece of metal, $i$, as long as the inside of the box, and wide enough to cover either set of orifices, $a'$ or $b'''$, as desired, and prevent the escape of seed therefrom.

A handle, $i'$, projects from the front side of the plate $i$, through a slot in the side of the seed-box, and said handle, having a number of holes made through it, may be fastened by means of a pin passed through it into the cross-piece beneath.

A partition C is placed centrally lengthwise of the box, and pivoted, at the bottom, in the ends of the box, and may be turned from side to side, so as to form a compartment for the reception of whatever kind of seed may be required, and to keep the same from the other part of the box.

When it is desired to sow broadcast, the orifices $b'''$ must be closed by the plate $c$, and the partition or flap C turned over to the rear side of the seed-box; also, all the sections of the serrated rim $a$ must be in place on the wheel, in order to produce a sufficiently rapid motion. But, when the machine is used as a planter, only three sections of the serrated rim are required on a four-foot wheel, the rest being removed. Indeed, all the sections may be removed, and the slides operated by hand, by means of a lever, $d$, pivoted upon the front side of the seed-box, and connected, at its lower extremity, with a pin projecting from the slide $b$, through a slot in the box.

The cultivator part of my invention consists of a three-sided frame-work, D, from the centre of which projects forward the tongue $d$, by which the whole apparatus is drawn, which tongue sustains the cultivator, and is itself connected with the axle by means of rods $d'\ d'$ and a guide-frame, projecting downward from the under side of the axle, through which guide-frame the rear end of the tongue passes, and by means of which and the rods $d'$, the tongue and cultivator may be brought up close under the axle, and there held through the agency of a rod having a hook on its lower end, and pivoted, at its upper end, to the rear extremity of a lever on the cover of the seed-box. It is desirable thus to elevate the cultivator when the machine is in transit. It may be readily lowered at any time.

The cultivator is made in two portions, whereof one part, D, in planting, bears two side plows, $d\ h'\ h'$, placed just forward of the seed-tubes. These plows cut the furrows for the deposit of the seed.

In broadcasting, two shovels more should be attached to the opposite side, on the rear end of the bars.

The other part, D', is a separate three-sided framework, hinged, at the forward end, to the front bar of the frame D, and bearing, at its rear end, two plows, h" h", placed, at regular intervals, within the lines of the side plows, and regulated by means of holes in either end of the cross-bar g.

The plows h" h" should be reversed to the opposite side of the bar while planting, and placed back for the purpose of cultivating the corn.

The object of the hinge is to allow it to be readily moved from side to side, and the more easily to free it from obstructions, and regulate its depth while working, and, when not in use, to be held up, out of the way, by the hooked rod.

The cultivator is thus made to answer the several uses required of the seed-box and corn-cultivator.

What I claim as new, and desire to secure by Letters Patent, is—

1. The combination, with the seed-box, of the broadcast-sower b, planter b', sliding plate i, swinging partition C, toothed segment k", toothed wheel, with shaft, armed with hooks M", all arranged and operating substantially as described.

2. The combination of the seeder, planter, cottonseed dropper, and cultivator, D D, adapted to either seeding, planting, covering the grain, or cultivating, as set forth.

Witnesses:    GEORGE W. CARPENDER.
  DANIEL KEEFER,
  REBECCA A. CARPENDER.